US012159779B2

(12) United States Patent
Kokbas

(10) Patent No.: US 12,159,779 B2
(45) Date of Patent: Dec. 3, 2024

(54) METHOD AND APPARATUS FOR PRODUCING FILAMENT ARRAY

(71) Applicant: BC MACHINING TECHNOLOGIES INC., Schomberg (CA)

(72) Inventor: Eugene Kokbas, Penetanguishene (CA)

(73) Assignee: BC MACHINING TECHNOLOGIES INC., Schomberg (CA)

( * ) Notice: Subject to any disclaimer, the term of this patent is extended or adjusted under 35 U.S.C. 154(b) by 806 days.

(21) Appl. No.: 17/269,813

(22) PCT Filed: Aug. 20, 2019

(86) PCT No.: PCT/CA2019/051130

§ 371 (c)(1),
(2) Date: Feb. 19, 2021

(87) PCT Pub. No.: WO2020/037404

PCT Pub. Date: Feb. 27, 2020

(65) Prior Publication Data

US 2021/0319997 A1 Oct. 14, 2021

Related U.S. Application Data

(60) Provisional application No. 62/720,879, filed on Aug. 21, 2018.

(51) Int. Cl.

| | |
|---|---|
| ***H01J 49/00*** | (2006.01) |
| ***B21F 23/00*** | (2006.01) |
| ***H01J 49/06*** | (2006.01) |

(52) U.S. Cl.

CPC ............ *H01J 49/068* (2013.01); *B21F 23/00* (2013.01)

(58) Field of Classification Search

CPC ........ H01J 49/068; B21F 23/00; B29C 53/56; B21C 47/003; B21C 47/04; B21C 47/063

See application file for complete search history.

(56) References Cited

U.S. PATENT DOCUMENTS 3,112,234 A * 11/1963 Krupp .................... B29C 53/60 156/169
3,539,317 A * 11/1970 Smith .................... C03B 37/03 226/177

(Continued)

FOREIGN PATENT DOCUMENTS

CN 202742670 U * 2/2013
CN 203778660 U 8/2014

(Continued)

OTHER PUBLICATIONS

Written Opinion and Invitation to Respond to Written Opinion issued by the Intellectual Property Office of Singapore (IPOS), dated Sep. 22, 2022, in connection with the Singapore Patent Application No. 11202101727Y, 7 pages.

(Continued)

*Primary Examiner* — Emmanuel M Marcelo

(57) ABSTRACT

Methods and apparatus are disclosed for producing a filament assembly with a flat frame. A frame holder is mounted to a lathe and a filament applicator is to the tool holder of the lathe. The applicator is movable along the lathe axis while the frame is rotated so that filament is wound around flat frame in a series of parallel passes. A spool of filament is rotatably supported on the applicator. The filament is guided through a filament path, and a tension control device applies tension to the filament.

24 Claims, 14 Drawing Sheets

(56) References Cited

U.S. PATENT DOCUMENTS

| | | | | | |
|---|---|---|---|---|---|
| 3,924,817 | A * | 12/1975 | Symborski | B65H 54/06 | |
| | | | | 242/472.8 | |
| 5,783,127 | A * | 7/1998 | Gross | D02J 13/005 | |
| | | | | 264/211.17 | |

FOREIGN PATENT DOCUMENTS

| | | | |
|---|---|---|---|
| EP | 0562520 | A1 * | 3/1993 |
| EP | 0570283 | A1 * | 5/1993 |

OTHER PUBLICATIONS

International Search Report & Written Opinion of the International Searching Authorityissued by the Canadian Intellectual Property Office on Nov. 28, 2019 in connection with International Patent Application No. PCT/CA2019/051130, 5 pages.

* cited by examiner

METHOD AND APPARATUS FOR PRODUCING FILAMENT ARRAY

RELATED APPLICATIONS

This is the U.S. National Stage of International Application No. PCT/CA2019/051130, filed Aug. 20, 2019, and claims priority from U.S. provisional patent application No. 62/720,879, filed Aug. 21, 2018 and titled METHOD AND APPARATUS FOR PRODUCING FILAMENT ARRAY, the entire contents of which are incorporated herein by reference.

FIELD

This relates to manufacturing, and in particular, to assembly of articles having filament arrays.

BACKGROUND

Certain devices require components with arrays of filaments. For example, mass spectrometers typically include a component referred to as a grid, which comprise arrays of parallel filaments less than one thousandth of an inch in diameter, and spaced at a very fine pitch for influencing movement of ions. Proper functioning of such grids requires extremely precise positioning and spacing of filaments.

Unfortunately, such filament arrays are difficult to produce by existing techniques. Thin metallic filaments are very fragile and may easily break under tension or by abrasion. Moreover, it is difficult to handle such fine filaments without disturbing their positions, which can lead to spoiling of parts. Accordingly, assembly tends to be expensive and labor intensive.

SUMMARY

An example apparatus for producing a filament assembly comprising a flat frame comprises: a frame holder mountable to a lathe for rotation of the flat frame about a lathe axis; a filament applicator mountable to a tool holder of the lathe for movement parallel to the lathe axis to wind the filament around the flat frame in a series of parallel passes, the filament applicator comprising: a spindle for rotatably supporting a spool of filament; a guide assembly defining a filament path; a tension control device for applying tension to the filament.

An example method of producing a filament assembly comprising a flat frame comprises: mounting a flat frame to a lathe for rotation about a lathe axis; feeding a filament through a guide of a dispenser; rotating the flat frame about the lathe axis to wind the filament around the flat frame; moving the dispenser along the lathe axis to create a series of parallel passes of the filament about the flat frame; during the rotating, applying tension to the filament using the dispenser.

An example filament applicator mountable to a tool holder of a lathe for movement parallel to wind a filament around a flat frame, the filament applicator comprising: a spindle for rotatably supporting a spool of filament; a guide assembly defining a filament path; a tension control device for applying tension to the filament.

BRIEF DESCRIPTION OF DRAWINGS

In the figures, which depict example embodiments.

DETAILED DESCRIPTION

Figure 1B:
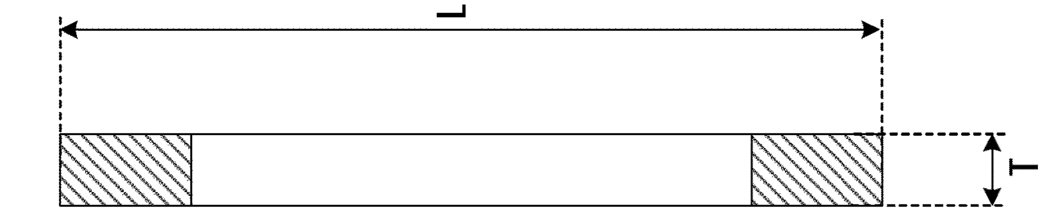
FIGS. 1A and 1B are top elevation and cross-sectional views, respectively, of a filament assembly.
Figure 1A:
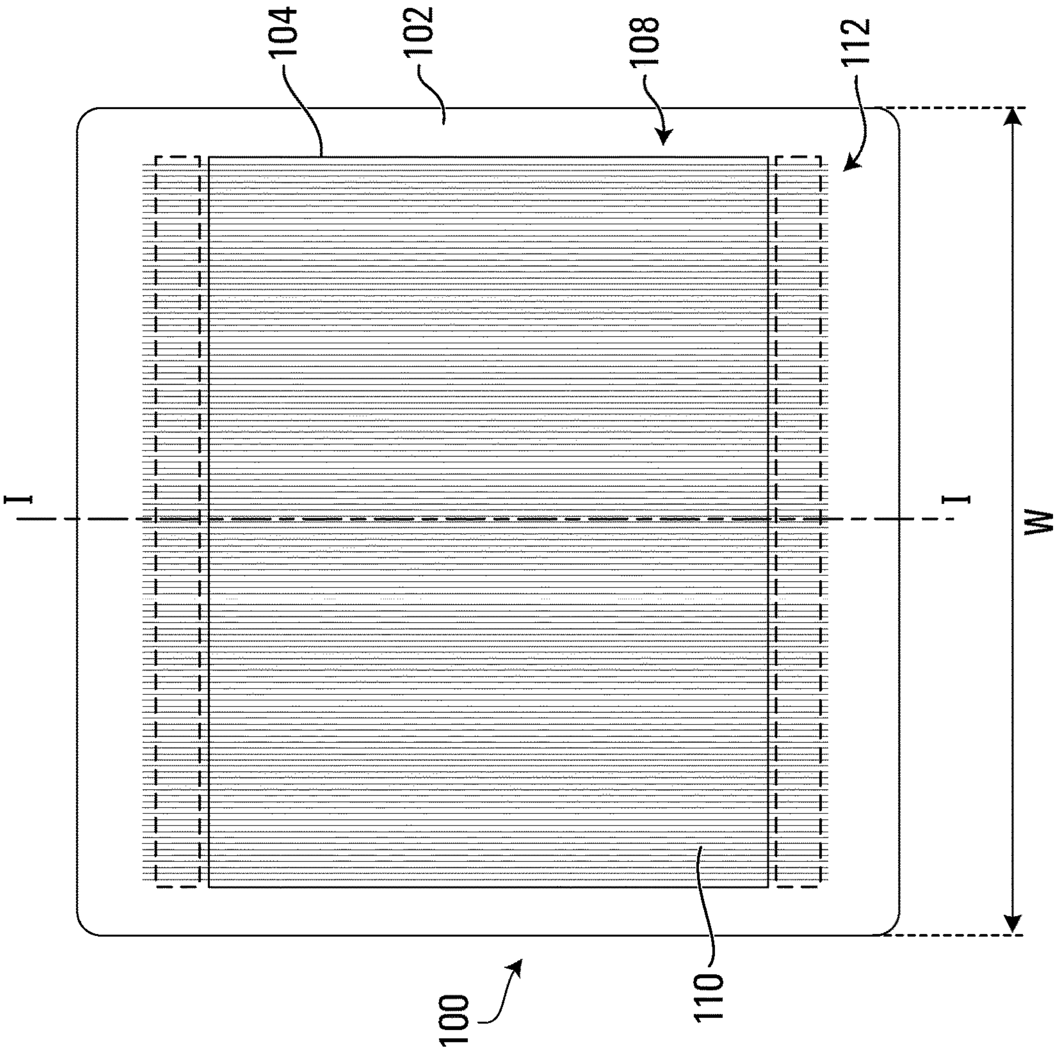

FIG. 1 depicts a plan view of a filament assembly 100. Filament assembly 100 comprises a frame 102, which may be metallic. Frame 102 has a window 104.

An array 108 of filaments 110 are positioned atop frame 102, spanning window 104. In the depicted embodiment, filaments 110 are very fine wires formed of a metal, namely, tungsten. Filaments 110 are typically on the order of 0.0007"-0.001" in diameter, but in some embodiments may be smaller, e.g. diameter of 0.0005".

Filaments 110 are oriented parallel to one another and to an axis I-I of frame 102 and are spaced apart at a fine pitch. Typically, the spacing between filaments 110 is on the order of 0.0001"-1.0000". In some embodiments, the spacing between filaments 110 is infinitely adjustable between minimum and maximum values. Filament assemblies produced for use as grids in mass spectrometers typically have spacing between 0.0001" and 0.25" between filaments 110. However, substantially any spacing may be set, according to the intended use of the filament assembly.

Filaments 110 are attached to frame 102 at fixation regions 112. In the depicted embodiment, an adhesive is applied in fixation regions 112 and retains filaments 110.

The depicted filament assembly 100 has a flat, generally rectangular shape. That is, as shown in FIG. 1B, frame 102 has a length L, measured parallel to frame axis I-I and a width W, measured transversely to frame axis I-I. The cross-sectional thickness T is significantly smaller than at least one of length L and width W. In the depicted embodiment, thickness T is significantly smaller than both length L and width W. In other embodiments, filament assembly 100 may have a non-rectangular shape. For example, filament assembly 100 may be generally disk-shaped or ring-shaped. That is, it may have a generally circular periphery and a thickness much smaller than its diameter.

Production of filament assembly 100 tends to be difficult and expensive. For example, handling and accurate positioning of filaments 110 is a challenge. Moreover, due to the fine gauge of filaments 110, the filaments have very low tensile strength and are therefore prone to breaking.

Figure 2:
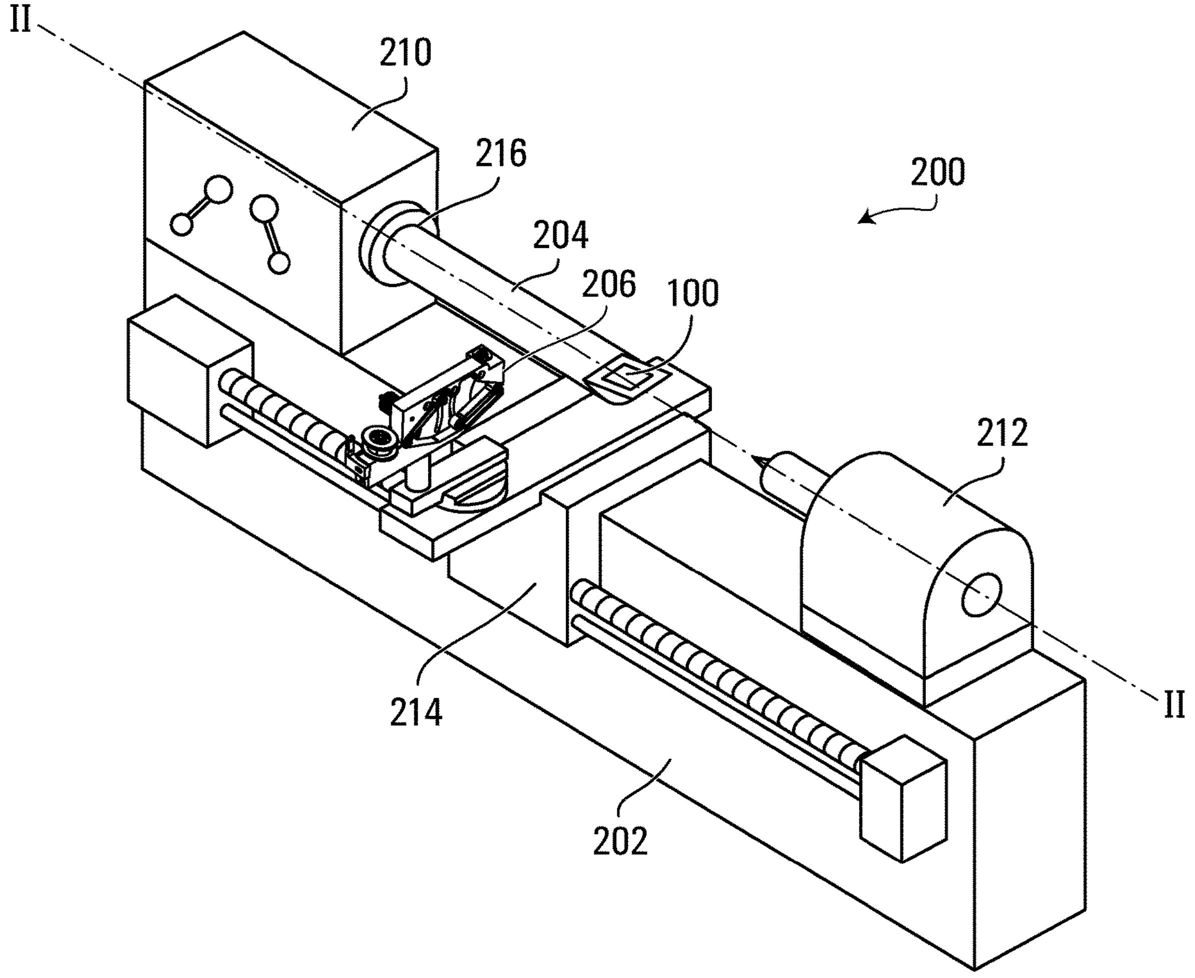
FIG. 2 is an isometric view of a system for assembling the filament assembly of FIGS. 1A-1B.

FIG. 2 depicts an example system 200 for assembling filament assemblies 100. System 200 includes a lathe 202, a workpiece holder 204, and a filament applicator 206.

Lathe 202 may be any suitable lathe, such as a computer-numerical control (CNC) lathe, and may be designed for turning metallic or other workpieces.

Lathe 202 has a headstock 210 and a tool holder 214. Headstock 210 has a chuck 216 for holding an object to be turned. Chuck 216 is selectively rotatable at a wide range of speeds by a drivetrain 218, which may comprise, for example, an electric motor and a gearset. Chuck 216 and an object secured in chuck 216 may be rotated around a lathe axis II-II.

Tool holder 214 is movable relative to headstock 210 in directions parallel to and perpendicular to the lathe axis II-II. As explained in further detail below, filament applicator 206 may be mounted to tool holder 204 and may feed a filament 110 from a spool onto frame 102 as the frame is rotated by chuck 216.

Figure 3:
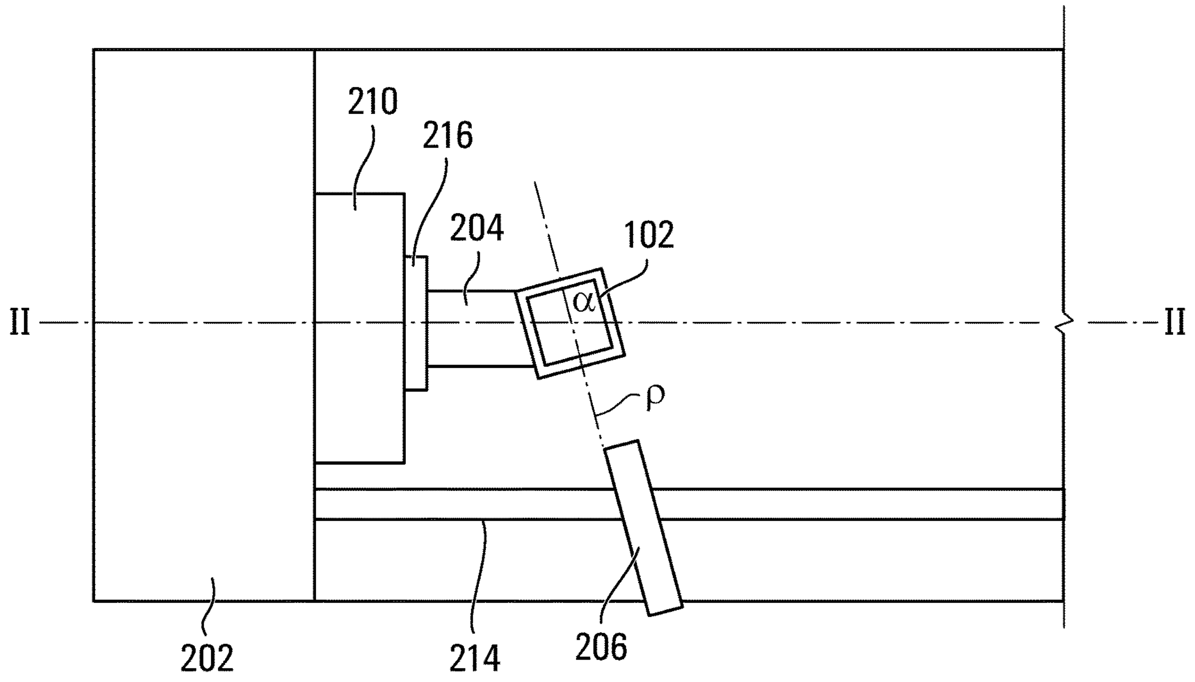
FIG. 3 is a simplified top plan view of the system of FIG. 2.

FIG. 3 is an overhead plan view of system 200 and a frame 102 of a filament assembly 100, showing relative orientations of components. As noted, chuck 216 is operable to rotate an object about a lathe axis II-II. Filament applicator 206 is mounted to a tool holder 214, which is operable to move the filament applicator 206 in a direction parallel to lathe axis II-II.

During production of filament assembly 100, filaments 110 may be wound from filament applicator 206 onto frame 102 by rotation of frame 102 along with chuck 216. With each revolution of frame 102, a pass of filament 110 may be wrapped around the frame. Tool holder 214 and filament applicator 206 may concurrently be moved along the length of lathe 202 (i.e. parallel to axis II-II). Thus, filaments 110 trace a spiral (e.g. helical) path as they are dispensed.

The pitch of the path defined by dispensed filaments 110 depends on the rotational speed of frame 102 and the rate at which filament applicator 206 is advanced along the lathe axis II-II. In particular, the longitudinal distance spanned by each pass of filament 110 is defined by the speed of applicator 206 relative to the rate of rotation. Movement of applicator 206 may be synchronized with rotation of chuck 216 such that filament 110 is dispensed in a constant helical path.

The path defined by filaments 110 therefore is not square to axis II-II of lathe 202. Rather, the path is skewed relative to the lathe axis. That is, it forms an angle $\alpha$ (e.g. an obtuse angle) with the lathe axis.

Figure 4:
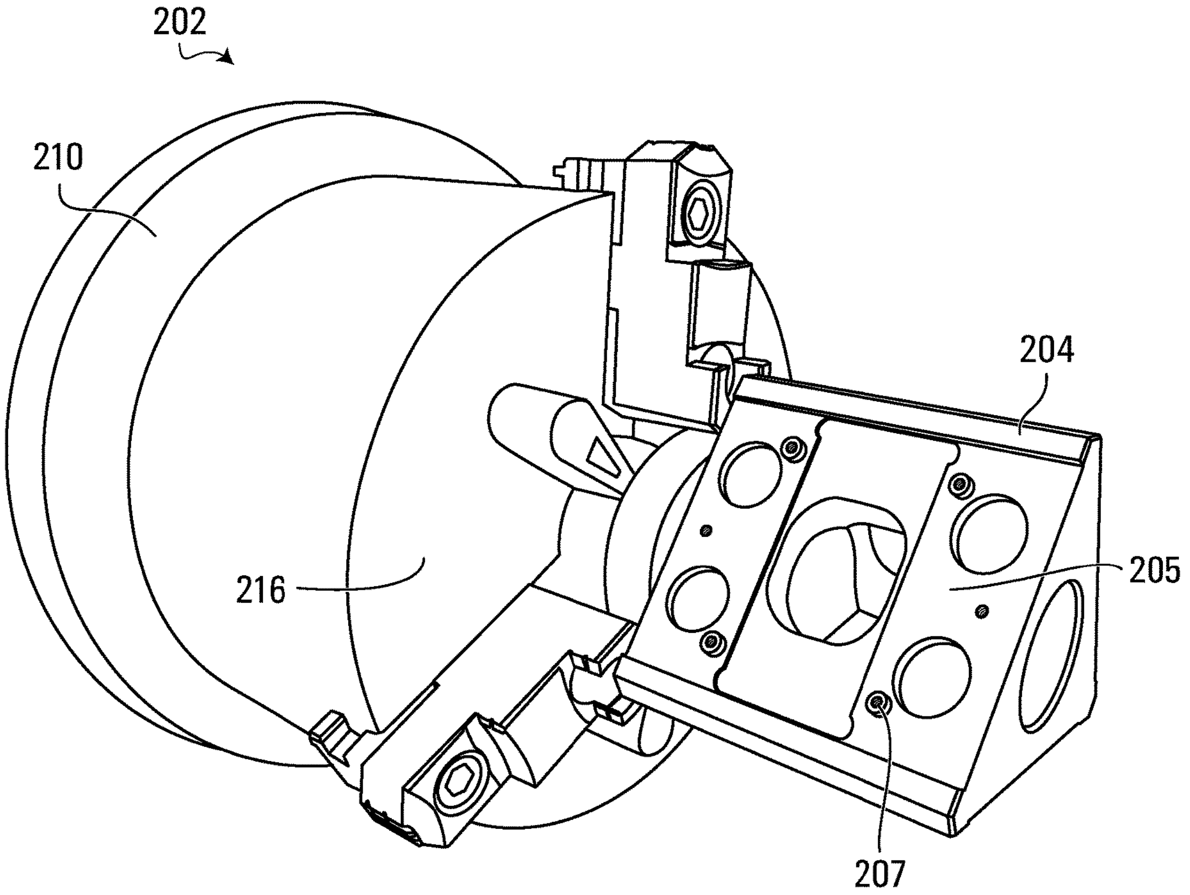
FIG. 4 is a perspective view of a workpiece holder of the system of FIG. 2.

FIG. 4 shows workpiece holder 204 in greater detail. As depicted, workpiece holder 204 is a block with one end sized for reception in chuck 216 and another end defining a mount 205 for a frame 102 of filament assembly 100. The mount may comprise a nest or series of detents 207 sized and spaced to receive frame 102 in a specific orientation. In the depicted embodiment, detents 207 are threaded to receive screws for clamping a frame 102 in place. In other embodiments, frame 102 may be secured with different techniques. For example, detents 207 may include clips for engaging frame 102. Alternatively or additionally, frame 102 may be wedged against detents 207.

Figure 5A:
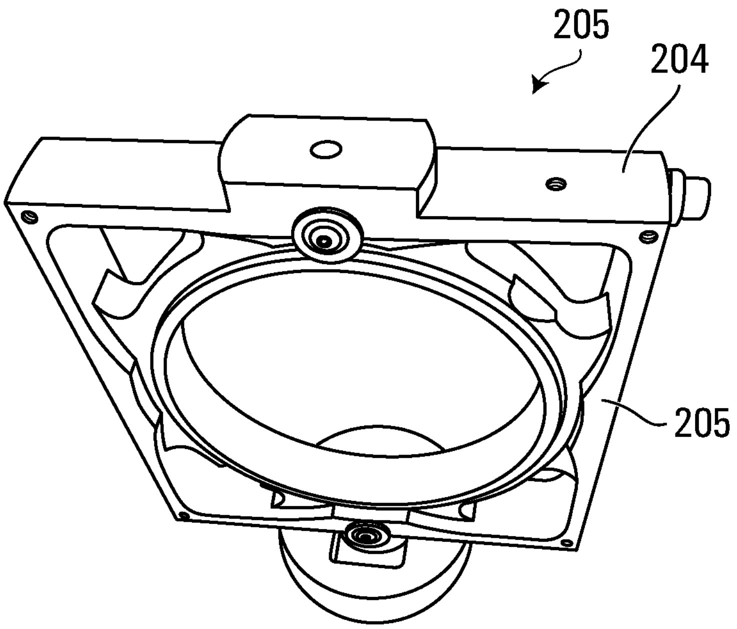
FIGS. 5A-5B are perspective views of other workpiece holders.
Figure 5B:
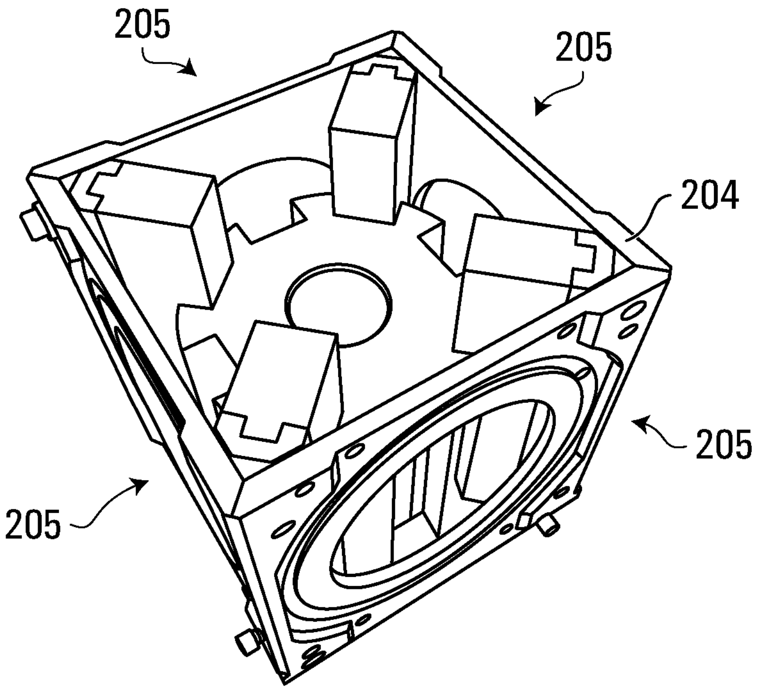

As shown in FIG. 4, workpiece holder 204 has a triangular cross-section, with a mount 205 on each of three sides. Thus, up to three frames 102 can be simultaneously mounted on workpiece holder 204. Filament 110 may be wound around the three frames simultaneously. In other embodiments, workpiece holder 204 may have a different shape and may accommodate any number of frames 102. For example, FIG. 5A depicts a workpiece holder 204 with two mounts 205, for receiving two frames 102. FIG. 5B depicts a workpiece holder 204 with four mounts 205, for receiving four frames 102.

Workpiece holder 204 is configured to hold frame 102 in a skewed orientation such that frame axis I-I is aligned parallel to the helical path defined by filaments 110 exiting the filament applicator 206. Frame axis I-I forms an angle $\alpha$ with lathe axis II-II, which is equal to the angle between the path defined by filaments 110 and the lathe axis II-II.

In other embodiments, frame axis I-I may be perpendicular to the path formed by filaments 110. In such embodiments, filaments 110 may be wound onto frame 102 transversely to the frame axis I-I.

Figure 6A:
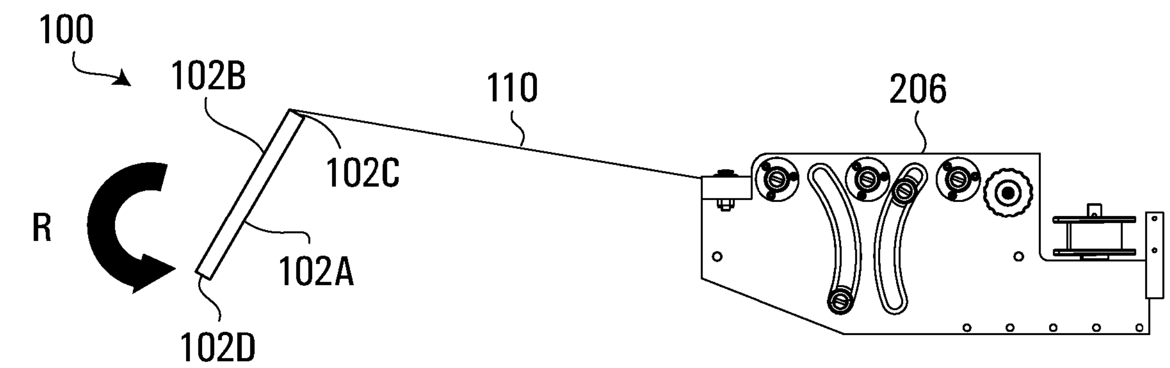
FIGS. 6A-6C are schematic diagrams showing stages of winding a filament around a frame.
Figure 6B:
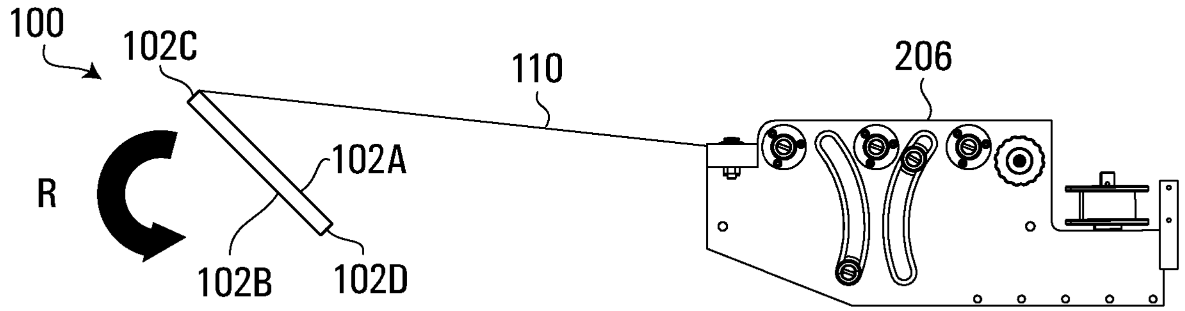
Figure 6C:
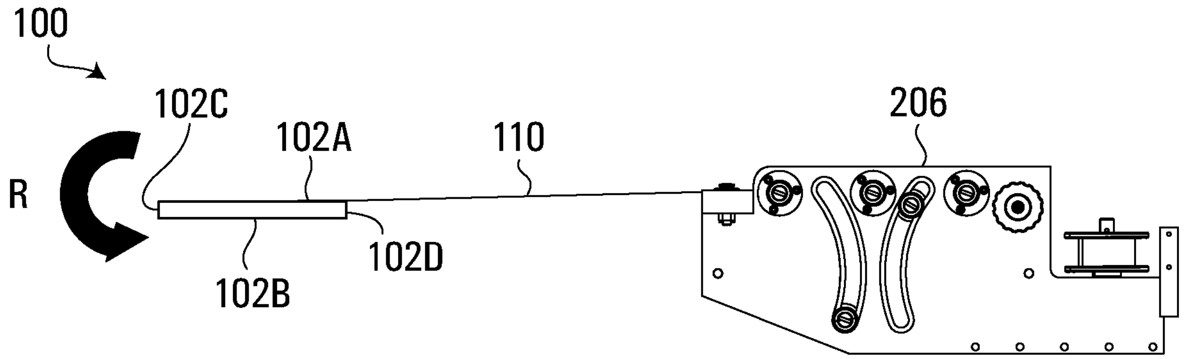

FIGS. 6A-6C are simplified end views of filament 110 being wound onto frame 102. As depicted, frame 102 rotates in a counter-clockwise direction R with filament 110 fixed to the frame 102 proximate an edge of the frame. As frame 102 rotates, it pulls filament 110 away from filament applicator 206 causing filament 110 to advance and creating tension in filament 110.

The rate at which frame 102 pulls filament 110 away from applicator 206 varies during each rotation of frame 102, as do the tension created in filament 110 and the direction in which the tension acts, relative to applicator 106.

For example, FIGS. 6A, 6B and 6C show a frame 102 in three different positions, corresponding to three different stages of rotation of the frame. The front, back and end surfaces of frame 102 are labelled as 102A, 102B, 102C, 102D. Filament 110 is fixed to frame 102 proximate the edge joining surfaces 102B, 102C.

As shown in FIG. 6A, filament 110 is pulled taut over surface 102B as frame 102 rotates toward an upright position and surface 102B moves away from applicator 206. As frame 102 passes the upright position, filament 110 is pulled taut over surface 102C and surface 102C rotates away from filament applicator 206 as frame 102 approaches a horizontal orientation (FIG. 6B). After frame 102 passes the horizontal rotation, filament 110 is pulled taut over surface 102A as frame 102 again approaches the vertical, then over surface 102D as frame 102 passes the vertical.

Figure 7:
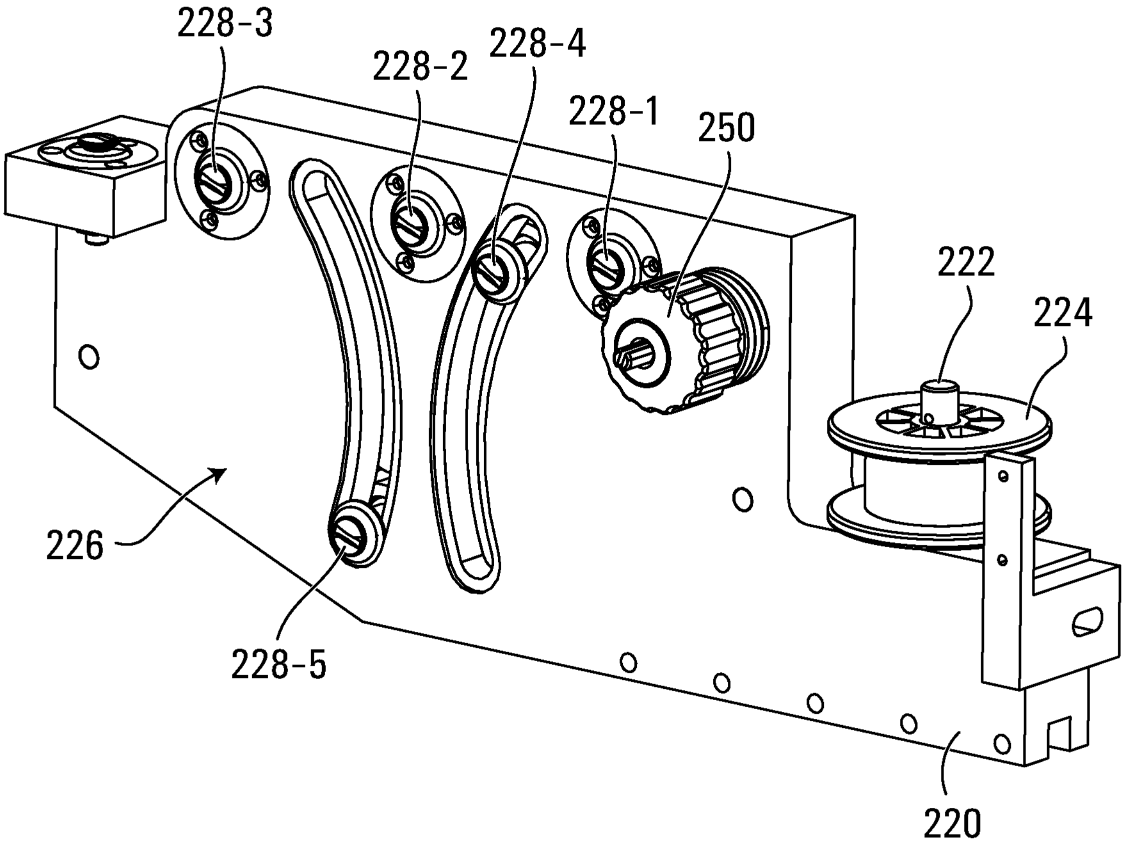
FIG. 7 is an isometric view of a filament applicator.

Referring to FIG. 7, filament applicator 206 is shown in greater detail. Filament applicator 206 has a carriage 220 with a spindle 222 for rotatably carrying a spool 224 of filament 110. In some embodiments, spindle 222 is fixed to carriage 220 and spool 224 can rotate on the spindle. In other embodiments, spindle 222 is free to rotate about its axis relative to carriage 220.

Filament applicator 206 further includes a guide assembly 226 defining a path for filament 110 to traverse as it is wound onto frame 102. In the depicted embodiment, guide assembly 226 includes capstans 228-1, 228-2, 228-3, 228-4, 228-5 (individually and collectively, capstans 228). Although five capstans 228 are shown, more or fewer capstans may be present. Filament 110 may be woven around capstans 228.

Figure 8:
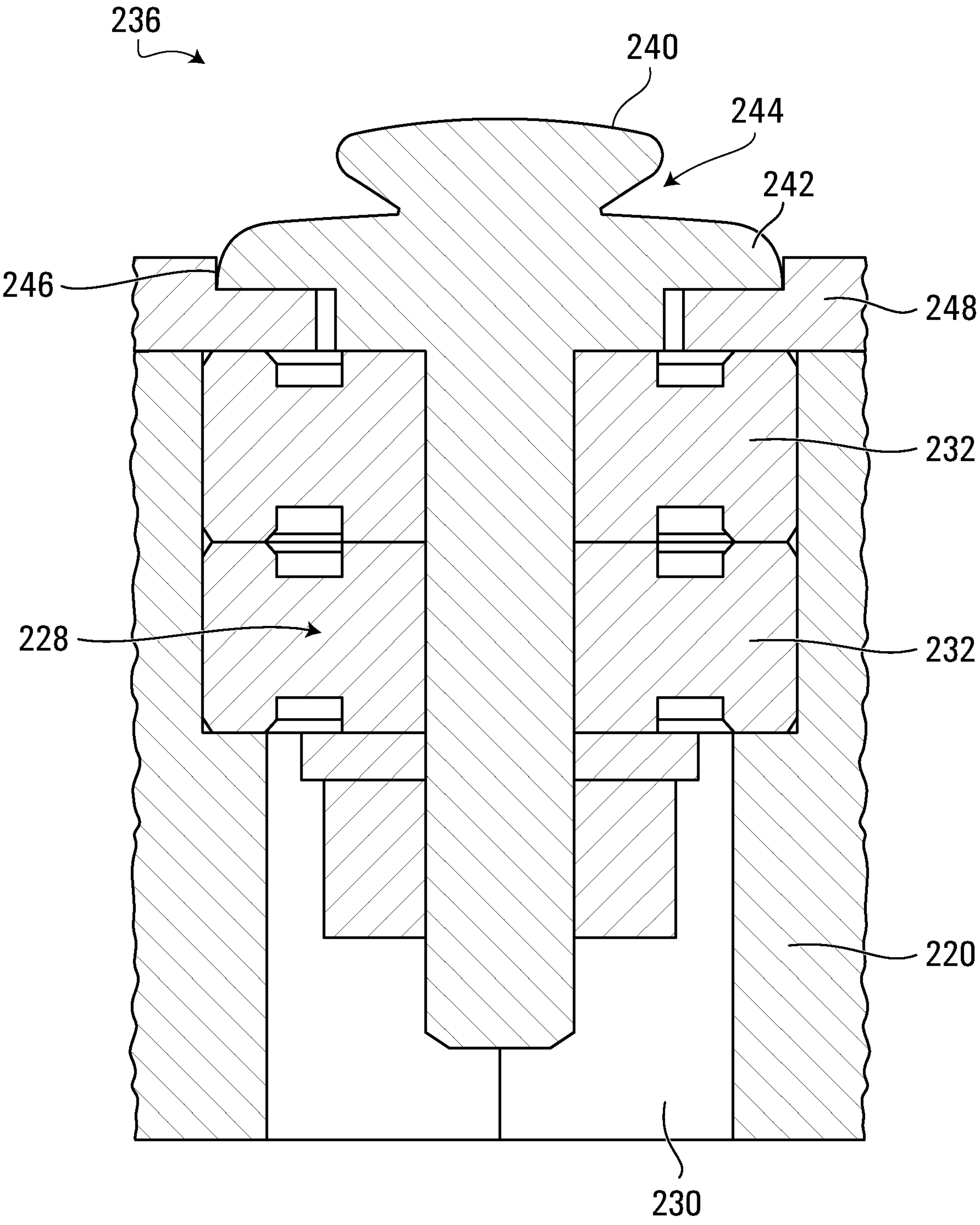
FIG. 8 is a cross-sectional view of a capstan assembly of the filament applicator of FIG. 7.

FIG. 8 shows a cross-sectional view of a capstan 228 and a portion of carriage 220. Capstan 228 is received in a cavity 230 in carriage 220 and is supported by a pair of bearings 232 which rest on a shoulder defined in cavity 230. Bearings 232 permit rotation of capstan 228 and limit friction on the capstan during rotation. Bearings 232 may be high-speed instrument bearings. In some embodiments, bearings 232 are installed without seals and operated without lubricant. In such embodiments, system 100 may be operated in a clean room environment to avoid fouling of bearings 232 by penetration of dust or other debris. In the depicted embodiment, the use of two bearings 232 for a single capstan 228 further reduces friction relative to a single bearing of the same type, and provides for positional stability of capstan 228. That is, the shaft of capstan 228 is braced by both bearings, such that wobbling of the capstan is limited.

Capstan 228 has a head 236 with upper and lower flanges 240, 242 defining a notch 244 for receiving filament 110. The depth and shape of notch 244 are configured to retain filament 110. That is, when filament 110 is under tension, the shape of notch 244 tends to urge the filament into the notch and inhibits the filament from slipping or migrating out of notch 244. In some embodiments, notch 244 has a root radius of 0.05 mm for use with a filament 110 that is 0.001" in diameter or less. Upper and lower flanges 240, 242 may be metallic and may have a low-friction surface finish to limit friction applied to filament 110 as it passes around capstan 228, but to avoid cutting of the capstan by the filament.

Lower flange 242 extends past the surface of carriage 220 into a recess 246. Recess 246 is sized to provide clearance and thereby allows free rotation of capstan 228. A retainer 248 is positioned atop bearings 232 such that retainer 248 does not contact the inner races of bearing 232. The retainer 248 is fixed (e.g. screwed) to carriage 220 to retain the capstan assembly in cavity 230. In the depicted embodiment, the outer surface of the retainer 248 is flush with the outer surface of carriage 220. However, in other embodiments, retainer 248 may extend past the surface of carriage 220. Thus, retainer 248 prevents migration of filament 110 into recess 246 without interfering with free rotation of capstan 228.

Figure 9:
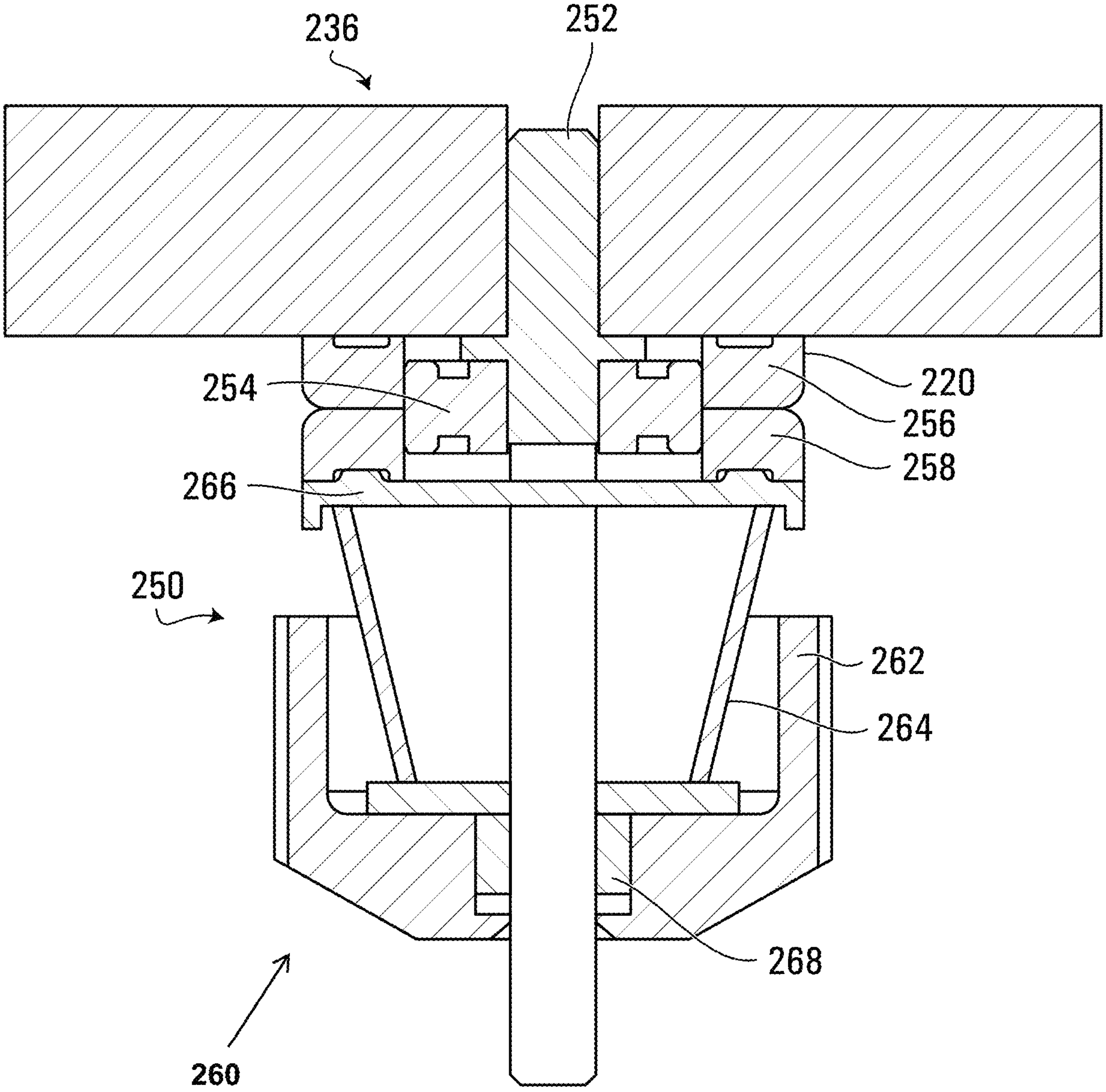
FIG. 9 is a cross-sectional view of a braking assembly of the filament applicator of FIG. 7.

Filament applicator 206 further includes a tension control subsystem. The tension control subsystem includes a braking assembly 250 for resisting unwinding of filament 110 and thereby applying tension to filament 110. Braking assembly 250 is shown in cross-section in FIG. 9.

Braking assembly 250 is configured for precise control of tension in filament 110. Braking assembly 250 includes a shaft 252 which is fixedly received in carriage 220. Shaft 252 carries a bearing 254. A pair of pressure plates 256, 258 are secured to the shaft 252 by way of bearing 254 and are free to rotate around shaft 252. In some embodiments, pressure plates 256, 258 are positioned such that they contact one another at a plane aligned with capstans 228. That is, capstans 228 and the contact plane between pressure plates 256, 258 are located at the same distance from carriage 220. Accordingly, the route of filament 110 around capstans 228 and between pressure plates 256, 258 may lie in a single plane.

An adjustment assembly 260 is mounted to shaft 252 and is operable to adjustably apply pressure to pressure plates 256, 258 to urge the pressure plates together. As depicted, adjustment assembly 260 includes a knob 262, spring 264, pressor 266 and a nut 268 which is retained by knob 262 and threads to shaft 252. Tightening of knob 262 and nut 268 against shaft 252 urges spring 264 and pressor 266 against pressure plates 256, 258. Pressor 266 is fixed, e.g. by keyed attachment to shaft 252 such that it does not rotate.

As explained in further detail below, filament 110 may be threaded between pressure plates 256, 258 such that it rests on the outer race of bearing 254. Knob 262 may be adjusted so that filament 110 is squeezed between the pressure plates. As filament 110 is advanced, bearing 254 permits free rotation of pressure plates 256, 258. As pressor 266 is urged into contact with pressure plates 256, 258, a sliding interface is created between pressor 266 and the rotating assembly of pressure plates 256, 258 with filament 110.

Thus, braking assembly 250 is capable of applying tension to filament 110 without application of sliding friction directly to filament 110. The applied friction can be precisely controlled. Stress concentrations, e.g. due to pressure points on filament 110 and stress variations, e.g. due to varying friction, can also be limited because pressure plates 256, 258 are able to rotate freely about bearing 254. In other words, substantially the only resistance to rotation of pressure plates 256, 258 is the consistent sliding friction created by pressor 266.

The tension control subsystem of applicator 206 further includes at least one tensioner 270. In the depicted embodiment, two tensioners 270-1, 270-2 are shown, however more or fewer tensioners may be present.

Filament 110 may be wound around tensioners 270, which are movable to create or relieve tension in filament 110 and to vary the length of the path followed by filament 110 as it advances through applicator 206.

Figure 10A:
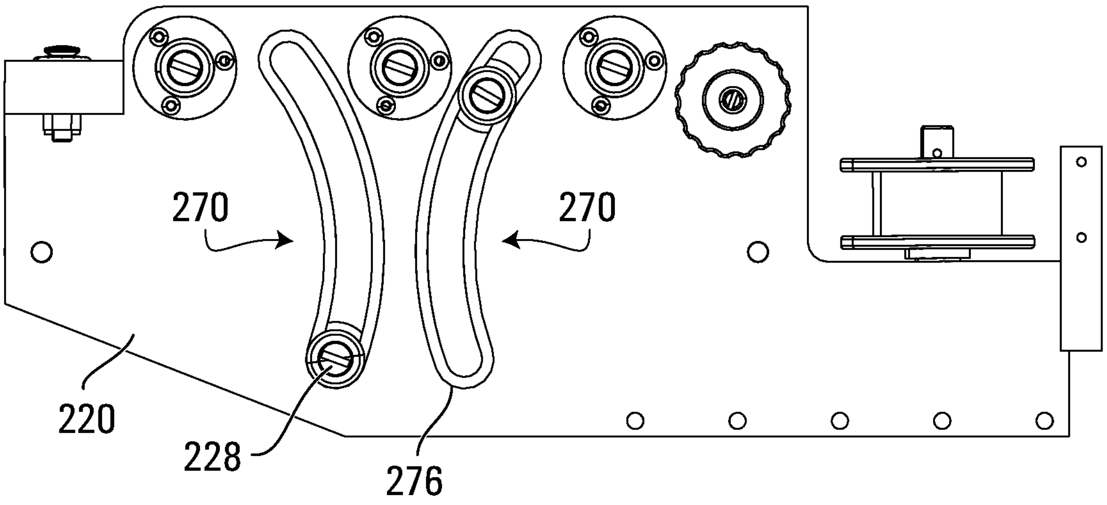
FIGS. 10A-10B are front and rear elevation views of the filament applicator of FIG. 7.
Figure 10B:
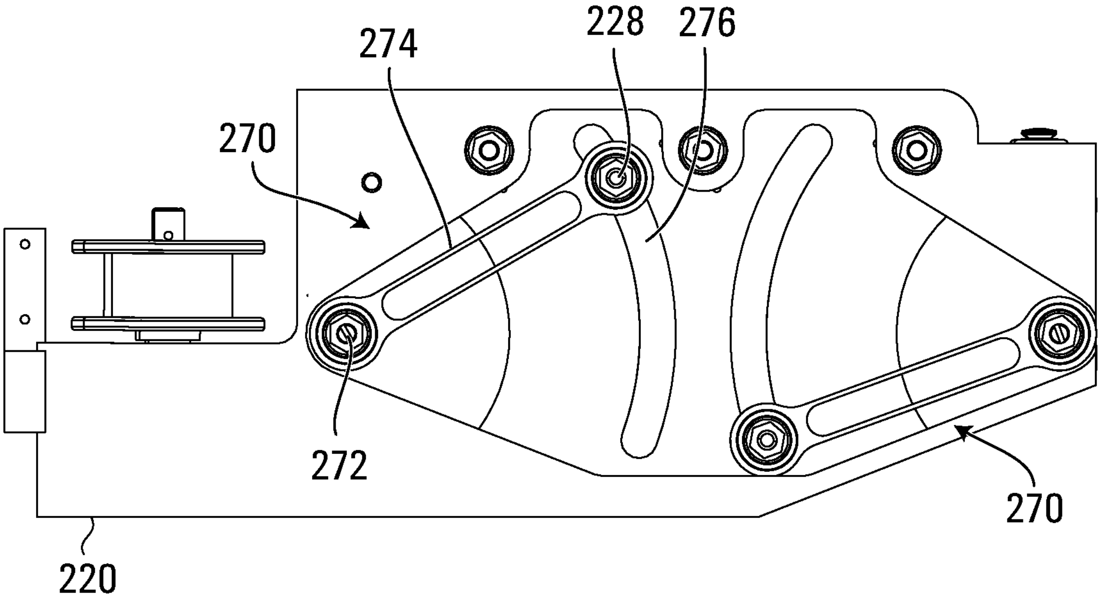

Tensioners 270 are best shown in FIGS. 10A-10B, which are front and rear elevation views, respectively, of filament applicator 206. Each tensioner 270 includes a hub 272 on which an arm 274 is pivotably mounted. A capstan 228 is received at the end of arm 274 and is movable within a guide slot 276. Each arm 274 can freely rotate about its respective hub 272 and each capstan 228 travels through an arc defined by the corresponding guide slot 276. Each arm is movable between a fully supported position in which the arm is held at the top of guide slot 276 (see tensioner 270-1 in FIGS. 10A-10B), and a fully released position in which the arm 274 falls under the influence of gravity to the bottom of the guide slot 276.

As noted, filament 110 may be woven around capstans 228 of each tensioner 270 such that tension in filament 110 resists movement of arms 274 to their respective fully released positions. Tensioners 270 may regulate tension in filament 110. In particular, if tension in filament 110 drops, arms 274 may fall downwardly, causing an increase in tension until the tension balances the weight of the tensioners 270. Dropping of tensioners 270 also increases the length of filament 110 between the arms. Thus, variations in winding rate and tension caused by rotation of frame 102 may be compensated.

The weight of tensioners 270 biases them downwardly to their fully released positions. In some embodiments, the weight of tensioners 270 may be adjusted to adjust the bias. For example, weights may be removably attached to arms 274. Increasing the bias of tensioners 270 increases the amount of tension maintained in filament 110. Typically, for a filament 110 that is 0.0005" in diameter, 50 g to 250 g of weight is attached to arms 274. The typical weight range may increase for thicker filaments 110 or higher rotation rates of workpiece holder 204.

Figure 12:
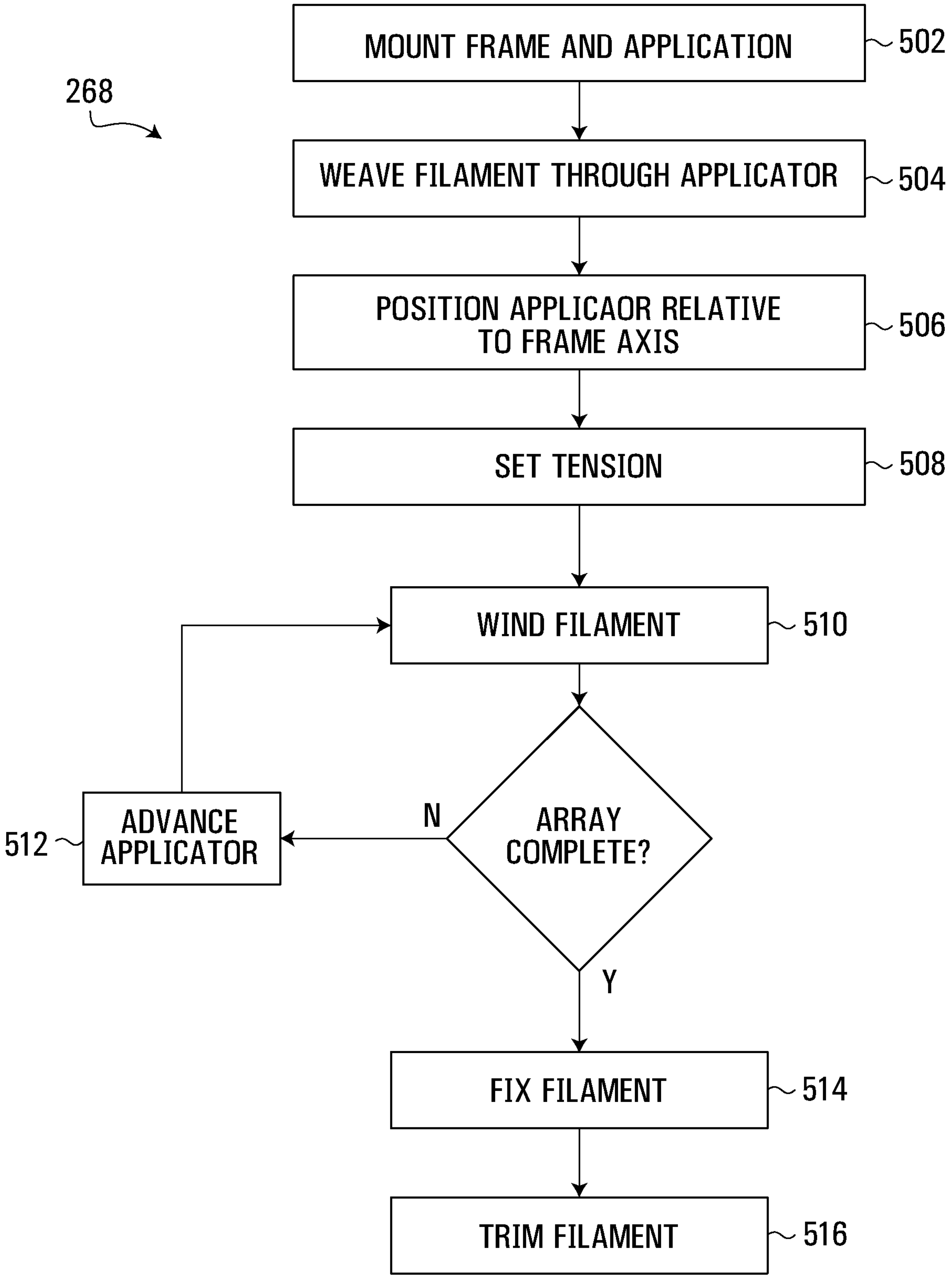
FIG. 12 is a flow chart showing a process for assembling the assembly of FIGS. 1A-1B.

FIG. 12 is a flow chart showing an example method 500 of producing a filament assembly. At block 502, a frame 102 is mounted to workpiece holder 204, which is installed in chuck 216. Carriage 220 of filament applicator 206 is mounted to tool holder 214.

At block 504, a spool of filament 110 is mounted to spindle 222 and an end of filament 110 is advanced from the spool and woven through the path defined by capstans 228.

Figure 11:
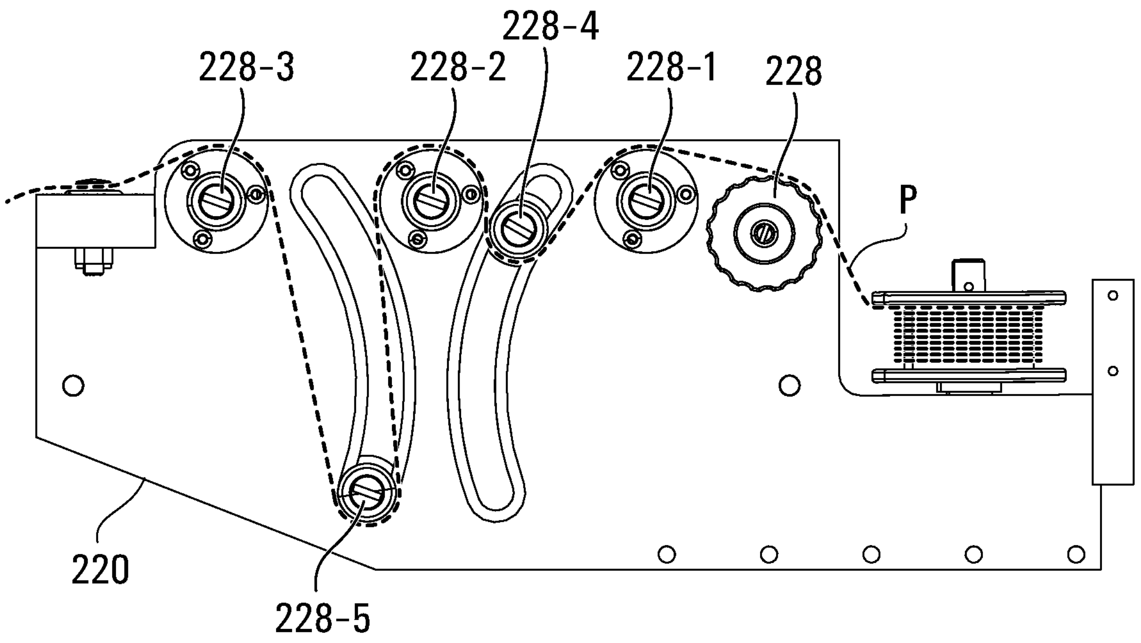
FIG. 11 is a front elevation view of the filament applicator of FIG. 7, showing a path of a filament.

FIG. 11 shows path P through which filament 110 is woven. As shown, filament 110 is wound around capstans 228 in an alternating over-under pattern. Specifically, filament 110 is advanced from its spool and passed between pressure plates 256, 258 of braking assembly 250 and then over capstan 228-1. Filament 110 is then passed under capstan 228-4, mounted to arm 274 of tensioner 270-1.

Filament 110 is then wound over capstan 228-2 and under capstan 228-5, mounted to arm 274 of tensioner 270-2. Finally, filament 110 is wound over capstan 228-3. The alternating over-under winding pattern positions filament 110 such that tension in filament 110 opposes gravity acting on tensioners 270.

At block 506, tool holder 214 and filament applicator 206 are positioned relative to frame axis I-I of frame 102, such that filament 110 may be drawn from filament applicator and attached (e.g. clamped) to frame 102, with filament 110 square to the frame axis I-I.

At block 508, braking assembly 250 and tensioners 270 are adjusted to set tension in filament 110. Specifically, braking assembly 250 is tightened so that pressure plates 256, 258 apply friction to filament 110 to thereby produce the desired tension. The bias of tensioners 270 is adjusted, e.g. by adding weight to the tensioners 270 to maintain consistent tension.

At block 510, workpiece holder 204 and frame 102 are rotated in chuck 216 which causes filament 110 to be drawn off its spool and out of filament applicator 206. As frame 102 completes each rotation, a pass of filament 110 is wrapped around frame 102. As used herein, a pass of filament 110 refers to a loop around the frame 102.

If additional passes are to be completed, at block 510, tool holder 214 is advanced along lathe axis II-II in order to apply another pass of filament 110, parallel to the first pass and spaced apart at a pitch. The pitch between passes of filament 110 may be controlled by the amount by which the tool holder is advanced along lathe axis II-II. In some embodiments, the pitch is between 0.0001"-1.0000". Typically, the pitch is about 0.008" (0.2 mm). The pitch may be infinitely adjustable between minimum and maximum values.

Thus, filament 110 is applied to frame 102 in a series of passes which are parallel to one another. Mounting of the frame 102 at a skewed angle relative to the lathe axis II-II results in a helical path traced by filament 110 forming a square array of parallel strands on the frame 102.

During the winding of filament 110 around frame 102, the rotation of the frame cooperates with braking assembly 250 and tensioners 270 to maintain approximately consistent tension in filament 110. Such maintenance of tension permits accurate positioning of filament 110 on frame 102.

At block 512, each pass of filament 110 is secured in place on frame 102 at fixation regions 112. In the depicted example, fixation is achieved by applying an adhesive, to frame 102 at fixation regions 112. The adhesive may be applied prior to winding of filament 110 such that the adhesive retains each pass of filament 110 with at least partial strength immediately upon or shortly after winding onto frame 102. The adhesive may, for example, be partially cured prior to application of the filament 110 and fully cured thereafter. Depositing of adhesive prior to winding of filament 110 avoids the risk of disturbing filament 110 by adhesive application.

At block 514 Filament 110 may be cut after fixation to frame 102 to separate passes of filament 110 into individual strands.

As described above, each capstan 228 is carried by a bearing. In some embodiments, the bearings used may be ball or roller bearings in order to minimize friction. In some embodiments, multiple bearings may be used to support some or all of capstans 228. The use of multiple bearings may provide positional stability. Specifically, in multiple-bearing configurations, capstans 228 may be less prone to wobbling as they rotate. As will be apparent, such wobbling may lead to errors in positioning of filament 110.

Figure 13:
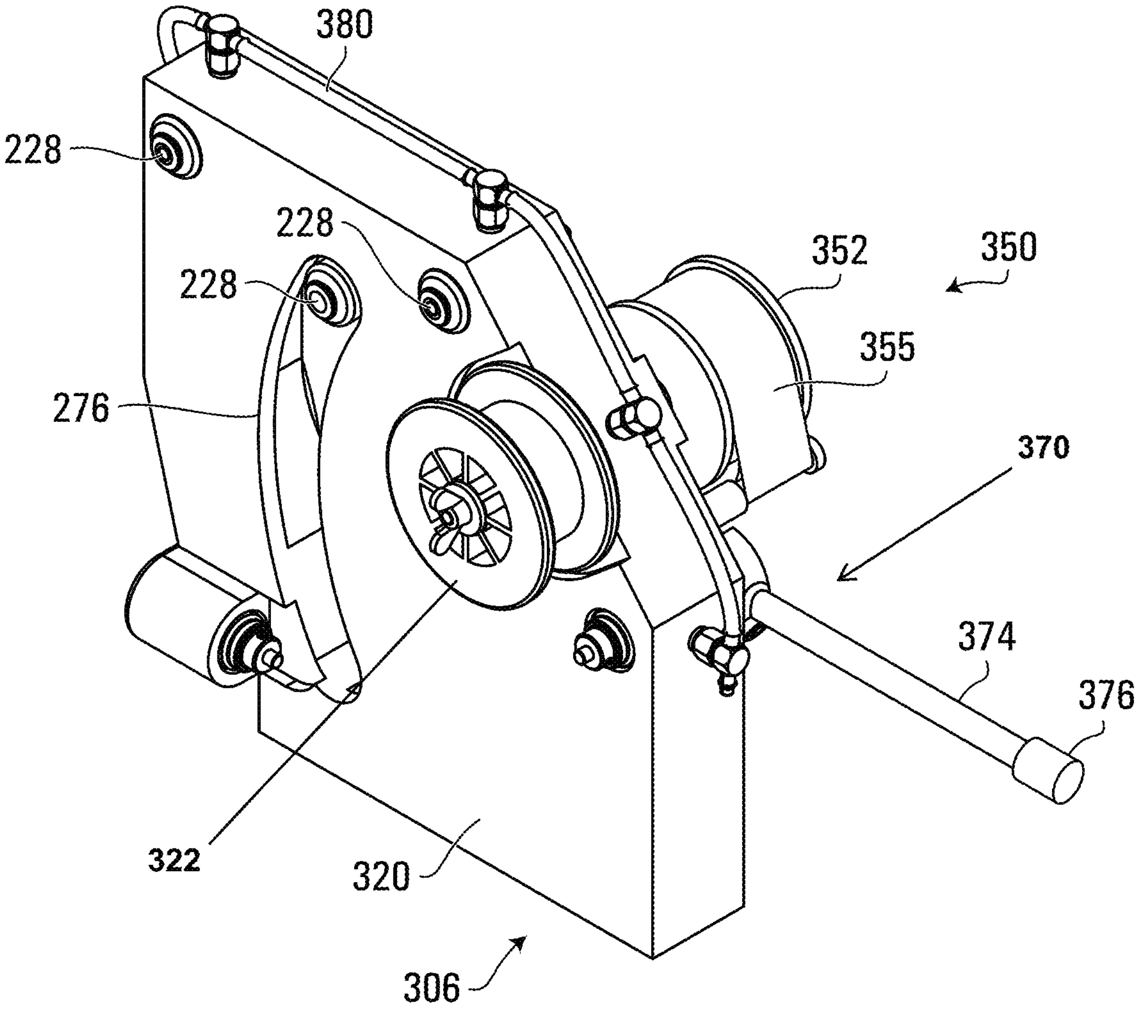
FIG. 13 is an isometric view of another filament applicator.
Figure 14A:
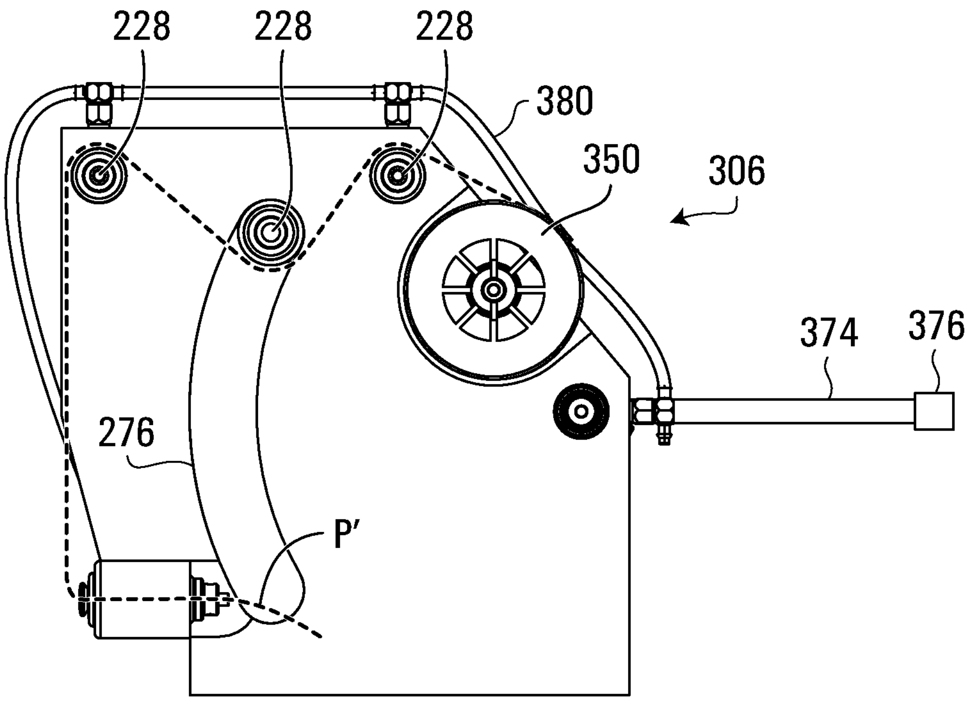
FIGS. 14A-14B are front and rear elevation views of the filament applicator of FIG. 13.
Figure 14B:
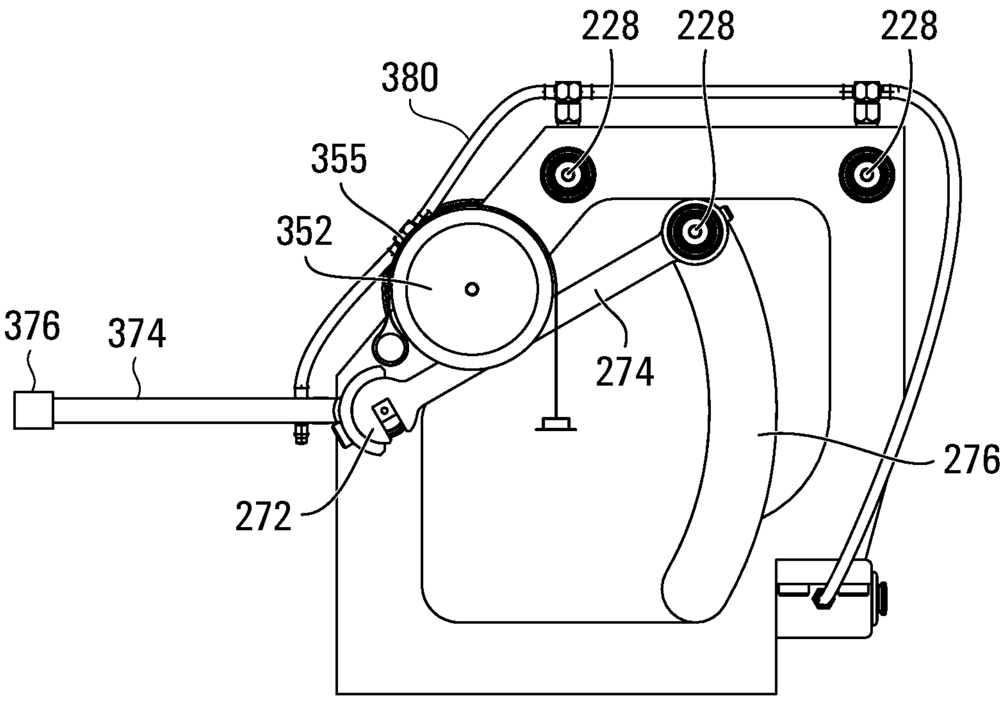

FIGS. 13, 14B, 14B are isometric, and front and rear elevation views of another example filament applicator 306. Like components of filament applicators 206 and 306 are identified with like reference characters.

Filament applicator 306 has a carriage 320 in which are mounted a spindle 322 and a plurality of capstans 228. Filament applicator 306 also has a tensioner 370 and a pneumatic supply 380.

While capstans 228 of filament applicator 206 are supported on carriage 220 by ball or roller bearings, capstans 228 of applicator 306 are supported on carriage 320 by air bearings (FIG. 13).

The air bearings receive a pressurized stream of air from pneumatic supply 380, which is fed to a space between the inner and outer races of the bearings. The pressurized air allows free rotation of the bearings, with relatively less friction than typical ball or roller bearings. In some embodiments, the bearings may rotate with substantially zero friction.

Reduction of friction in the bearings contributes to control of tension in filament 110. Specifically, bearing friction creates resistance to rotation of capstans carried by the bearings. The friction may vary as the capstans rotate or based on load applied to the capstans. Accordingly as friction is reduced, variability of tension in filament 110 is likewise reduced.

While braking assembly 250 of filament applicator 206 applies tension by squeezing filament 110 between pressure plates, filament applicator 306 has a braking assembly 350 that creates tension by directly resisting rotation of the filament spool. Specifically, braking assembly 350 includes a brake 352 mounted to the spindle 322 on which the filament spool is carried. Brake 352 includes a drum and friction member positioned against the drum. In the depicted example, the friction member is a strap 355 located on the outside of the drum. Strap 355 is adjustably weighted to bias the strap against the drum and thereby create friction. Biasing of the strap may be finely adjusted, such that friction on the drum may be precisely controlled, thereby precisely controlling tension in filament 110.

As depicted, filament applicator 306 includes a tensioner 370. Tensioner 370 is generally similar to tensioners 270. However, tensioner 370 further includes counterweight arm 374. Counterweight arm 374 is fixed to hub 272 and rotates along with hub 272 and arm 274. Removable weights 376 may be attached to counterweight arm 374.

As depicted, arm 274 and its capstan 228 are heavy enough to bias arm 274 downwardly with more force than is necessary to maintain tension in filament 110. Addition of weights 376 to counterweight arm 374 counteracts the weight of arm 274 and capstan 228 and thus reduces the tension maintained by tensioner 370. Application of weights to counterweight arm 374 allows tension to be applied in very fine increments, and very slight tension may be applied in order to wind filaments of diameter less than 0.0005" without excessive risk of breaking.

In some embodiments, counterweight arm 374 may be adjusted by adding or removing weights 376. Alternatively or additionally, bias may be adjusted by increasing or decreasing the distance of the counterweight from hub 272. That is, a fixed weight may be moved away from hub 272 along counterweight arm 374 to increase torque acting on counterweight arm 374. Conversely, the fixed weight may be moved toward hub 272 to decrease torque acting on arm

374. To allow such movement, counterweight arm 374 may be threaded and one or more weights may attach to arm 374 with mating threads.

The embodiments detailed herein are intended as examples only and are in no way limiting of the invention. Modifications are possible, as will be apparent to skilled persons. The invention is therefore defined by the claims, as interpreted in view of the application as a whole.

What is claimed is:

1. An apparatus for producing a filament assembly comprising a flat frame, the apparatus comprising:

a frame holder mountable to a lathe for rotation of said flat frame about a lathe axis;

a filament applicator mountable to a tool holder of the lathe for movement parallel to said lathe axis to wind said filament around said flat frame in a series of parallel passes, said filament applicator comprising:

a spindle for rotatably supporting a spool of filament;

a guide assembly defining a filament path; and a tension control device for applying tension to said filament.

2. The apparatus of claim 1, wherein said frame holder positions said frame with a frame axis at a skewed angle relative to said lathe axis, such that said frame axis is square to a helical path formed by said filament.

3. The apparatus of claim 2, wherein said frame axis is parallel to said helical path.

4. The apparatus of claim 2, wherein said frame axis is perpendicular to said helical path.

5. The apparatus of claim 1, wherein said guide assembly comprises a bearing device for limiting friction.

6. The apparatus of claim 5, wherein said bearing device comprises a rotatable capstan.

7. The apparatus of claim 6, wherein said bearing device comprises an air bearing.

8. The apparatus of claim 1, wherein said tension control device comprises a tension arm biased against said filament by gravity.

9. The apparatus of claim 8, wherein said tensioner is biased against said thread by an adjustable counterweight.

10. The apparatus of claim 1, wherein said tension control device comprises a braking device for resisting unwinding of said filament from said spool.

11. The apparatus of claim 10, wherein said braking device comprises a drum brake for resisting rotation of said spool.

12. The apparatus of claim 1, wherein said frame holder is configured to position said frame at a skewed angle to said lathe axis, and wherein said guide assembly is configured to guide said filament along a filament path in a series of parallel passes skewed relative to said lathe axis and square to said flat frame.

13. A method of producing a filament assembly comprising a flat frame, the method comprising:

mounting a flat frame to a lathe for rotation about a lathe axis;

feeding a filament through a guide of a dispenser;

rotating said flat frame about said lathe axis to wind said filament around said flat frame;

moving said dispenser along said lathe axis to create a series of parallel passes of said filament about said flat frame;

during said rotating, applying tension to said filament using said dispenser.

14. The method of claim 13, wherein mounting said flat frame to said lathe comprises mounting said flat frame with a frame axis at a skewed angle relative to said lathe axis, such that said frame axis is square to a helical path formed by said filament.

15. The method of claim 14, wherein said frame axis is parallel to said helical path.

16. The method of claim 14, wherein said frame axis is perpendicular to said helical path.

17. The method of claim 13, comprising guiding said filament through said path with a rotatable bearing device.

18. The method of claim 17, wherein said bearing device comprises an air bearing.

19. The method of claim 13, comprising applying tension to said filament with a weighted tension arm.

20. The method of claim 19, comprising adjusting an applied tension by adjusting a counterweight on said tension arm.

21. The method of claim 13, comprising applying tension to said filament by squeezing the filament between pressure plates.

22. The method of claim 13, comprising applying tension to said filament by applying a drum brake to a spool of said filament.

23. The method of claim 13, comprising positioning said flat frame at a skewed angle to said lathe axis, and wherein said series of parallel passes are skewed relative to said lathe axis and square to said flat frame.

24. A filament applicator mountable to a tool holder of a lathe for movement parallel an axis of said lathe to wind a filament around a flat frame, said filament applicator comprising:

a spindle for rotatably supporting a spool of filament;

a guide assembly configured to dispense said filament along a filament path in a series of parallel passes skewed relative to the lathe axis and square to said flat frame; and a tension control device for applying tension to said filament.

* * * * *